United States Patent
Lawson et al.

(10) Patent No.: US 11,927,088 B2
(45) Date of Patent: *Mar. 12, 2024

(54) MANIFOLD HEADER FOR USE AT A WELLSITE

(71) Applicant: LWF Services, LLC, Odessa, TX (US)

(72) Inventors: Jeffrey Alan Lawson, Midland, TX (US); Christopher James Lawson, Odessa, TX (US)

(73) Assignee: LWF Services, LLC, Odessa, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,617

(22) Filed: Sep. 29, 2022

(65) Prior Publication Data

US 2023/0013348 A1  Jan. 19, 2023

Related U.S. Application Data

(63) Continuation of application No. 17/460,725, filed on Aug. 30, 2021, now Pat. No. 11,486,240, which is a continuation of application No. 17/304,603, filed on Jun. 23, 2021, now abandoned.

(51) Int. Cl.
*E21B 43/26* (2006.01)
*F16L 41/03* (2006.01)

(52) U.S. Cl.
CPC .......... *E21B 43/2607* (2020.05); *E21B 43/26* (2013.01); *F16L 41/03* (2013.01)

(58) Field of Classification Search
CPC ...... E21B 43/2607; E21B 43/26; F16L 41/03; F16L 57/06
See application file for complete search history.

(56) References Cited

U.S. PATENT DOCUMENTS

| | | | | |
|---|---|---|---|---|
| 10,662,749 | B1* | 5/2020 | Hill | F16L 41/021 |
| 11,486,240 | B1* | 11/2022 | Lawson | E21B 43/2607 |
| 2003/0117890 | A1 | 6/2003 | Dearing et al. | |
| 2016/0230510 | A1 | 8/2016 | Micken et al. | |
| 2016/0319805 | A1 | 11/2016 | Dille | |
| 2020/0325743 | A1 | 10/2020 | Brezden et al. | |

* cited by examiner

*Primary Examiner* — James G Sayre
(74) *Attorney, Agent, or Firm* — Chamberlain, Hrdlicka, White, Williams & Aughtry; Aly Z. Dossa

(57) ABSTRACT

A pumping system for pumping a fluid for a wellsite. The pumping system includes a manifold assembly and pumping systems in fluid communication with the manifold header. The manifold assembly includes a manifold header that includes a manifold header body and outlets. The manifold header body includes an inlet to receive the fluid and an interior bore. Each outlet includes an entrance section shaped to have a profile that is approximately the same as a profile of an inner surface of the manifold header body, an outlet port shaped to flow the fluid approximately perpendicular to a longitudinal axis of the manifold header body, and a transition section shaped to have a radius of curvature that transitions from the profile of the entrance section to the outlet port and reduces internal erosion of the outlet due to the fluid flowing from the manifold header and through the outlet port.

19 Claims, 4 Drawing Sheets

MANIFOLD HEADER FOR USE AT A WELLSITE

BACKGROUND

This section is intended to provide relevant background information to facilitate a better understanding of the various aspects of the described embodiments. Accordingly, it should be understood that these statements are to be read in this light and not as admissions of prior art.

Manifolds are frequently used in hydraulic fracturing systems to direct the flow of fracturing fluid. Conventional manifolds with welded-on outlets tend to wear prematurely. The piping within the manifold must redirect the viscous fracturing fluid at high contact angles and high pressure, resulting in turbulent flow and subjecting the manifold to erosive wear. The piping within the manifold is particularly eroded at junctions where the direction of fluid flow changes sharply, such as at the joint between the outlet and the manifold header body and at the spool where the flange is welded onto the outlet.

Erosive wear on the outlets causes washout, leading to pipe leaks and potentially failure. Premature wear increases equipment maintenance and replacement costs. Reinforcing plates can be added at the joints, spools, and other pipe locations most affected by wear, but such plates are costly and difficult to install due to their weight and intricate positioning within the manifold header. The joint connection can be sanded for a smoother joint resulting in slower wear, but the manifolds still incur premature wear. A need therefore exists for a manifold header capable of redirecting fluid flow through the outlets without causing such premature wear.

BRIEF DESCRIPTION OF THE DRAWINGS

Embodiments of a manifold header are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes a manifold header. The manifold header includes an inlet and multiple holes that each have an outlet disposed therein. Fracturing fluid, well treatment fluid, or other wellsite fluids are received in the inlet and distributed to pumping systems or other wellsite equipment via the outlets. The interior profile of the outlets reduces internal erosion of the outlet, allowing for a longer service life of the manifold header. Additionally, the manifold header can be used as a suction manifold that receives fluid from multiple sources and discharges the combined fluid through a single port.

Figure 1:
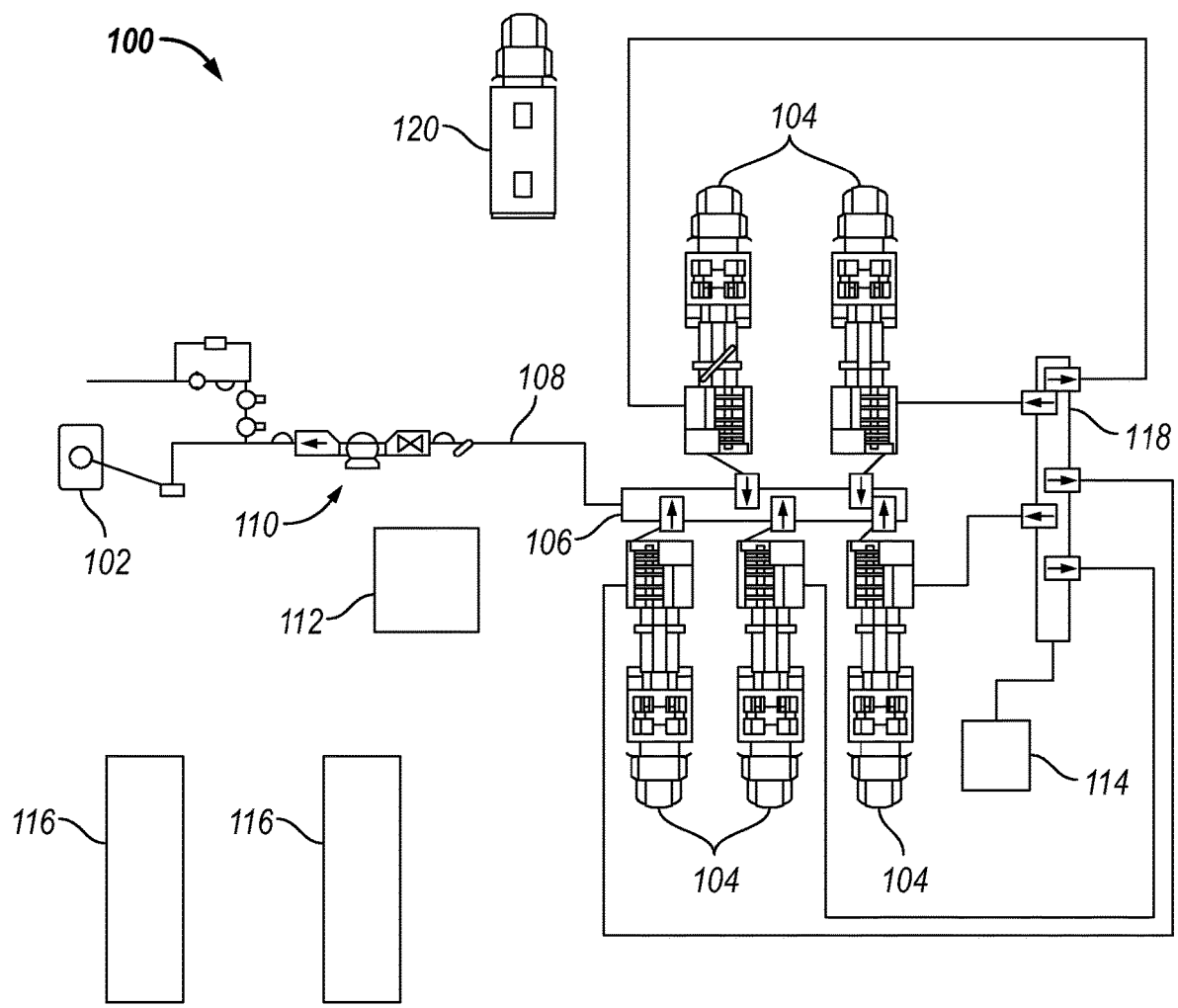
FIG. 1 is a schematic view of a wellsite according to one or more embodiments.

FIG. 1 is a schematic diagram of a wellsite 100, according to one or more embodiments. Turning to FIG. 1, the wellsite includes a wellhead 102 positioned over a wellbore (not shown) and connected to one or more pieces of wellsite equipment, such as, pumping systems 104. The pumping systems 104 are connected to a manifold assembly 106 and piping 108. Further, the piping 108 may include additional equipment, such as, valves 110 and flowmeters (not shown). This additional equipment may be used, e.g., to monitor and/or control the flow of fluid into a wellbore through the wellhead 102.

The wellsite 100 may also include other pieces of equipment, such as, a generator 112, a blender 114, storage tanks 116 (two shown), a distribution manifold header 118, and a monitoring and control unit 120. Each of these additional pieces of equipment is described below.

The storage tanks 116 may contain fuel, wellbore fluids, proppants, diesel exhaust fluid, and/or other fluids. The distribution manifold header 118 is fluidly coupled to one or more pieces of wellsite equipment, such as, the pumping systems 104, the generator 112, the blender 114, or the monitoring and control unit 120. The distribution manifold header 118 may distribute fluids, such as, fuel, diesel exhaust fluid, fracturing fluid, and/or other fluids, to the pieces of wellsite equipment 104, 112, 114 from one or more of the storage tanks 116 and/or the blender 114. In one or more embodiments, all or a portion of the aforementioned wellsite equipment may be mounted on trailers. However, the wellsite equipment may also be free standing or mounted on a skid.

Figure 2:
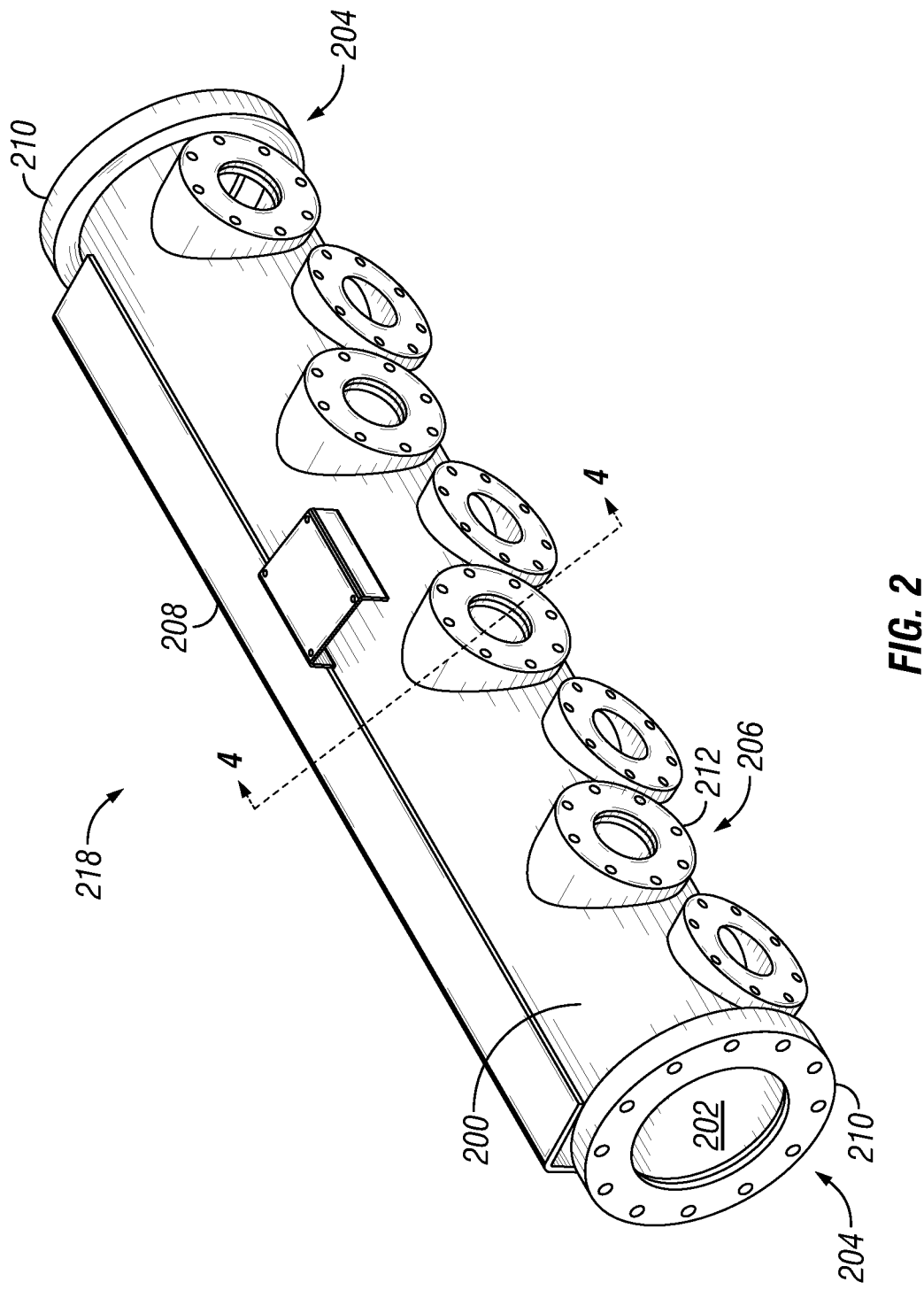
FIG. 2 is an isometric view of a manifold header, according to one or more embodiments.

Turning now to FIG. 2, FIG. 2 is an isometric view of a distribution manifold header 218, according to one or more embodiments. The distribution manifold header 218 includes a manifold header body 200 having an interior bore 202, two inlets 204, and outlets (one indicated, 206). In other embodiments, one of the inlets 204 may be omitted and the interior bore 202 may extend through only a portion of the manifold header body 200. The distribution manifold header 218 may also include mounting brackets, such as the mounting bracket 208 shown in FIG. 2. In other embodiments, the mounting bracket 208 may be omitted or positioned in different locations based on the mounting configuration of the distribution manifold header 218.

As shown in the illustrated embodiment, the inlets 204 may each include a flange 210 that is welded to or formed from the manifold header body 200. A mating flange coupled to a supply pipe or hose (not shown) may be bolted to one of the flanges 210 to supply fluid to the distribution manifold header 218. In other embodiments, a supply pipe or hose may be coupled to the distribution manifold header 218 via a threaded connection, welded connection, or other type of connection know to those skilled in the art. Further, one of the inlets 204 may not be used in all applications. In such applications, the inlet 204 not in use be sealed via a blank flange or similar component (not shown).

The outlets 206 may be welded to the manifold header body 200. In other embodiments, the outlets may be integrally formed with the manifold header body 200 via machining, additive manufacturing, or other means known to those skilled in the art. In one or more embodiments, the distribution manifold header 218 includes outlets 206 that may be positioned across the entire circumference of the distribution manifold header 218, instead of only a portion of the circumference as shown in FIG. 2. Additionally, the outlets 206 may vary in size from one another (e.g., one outlet 206 may be sized for a 4 inch flange connection and the remaining outlets 206 may be sized for a 6 inch flange connection), with each outlet 206 maintaining the internal profile discussed in more detail below.

Figure 3:
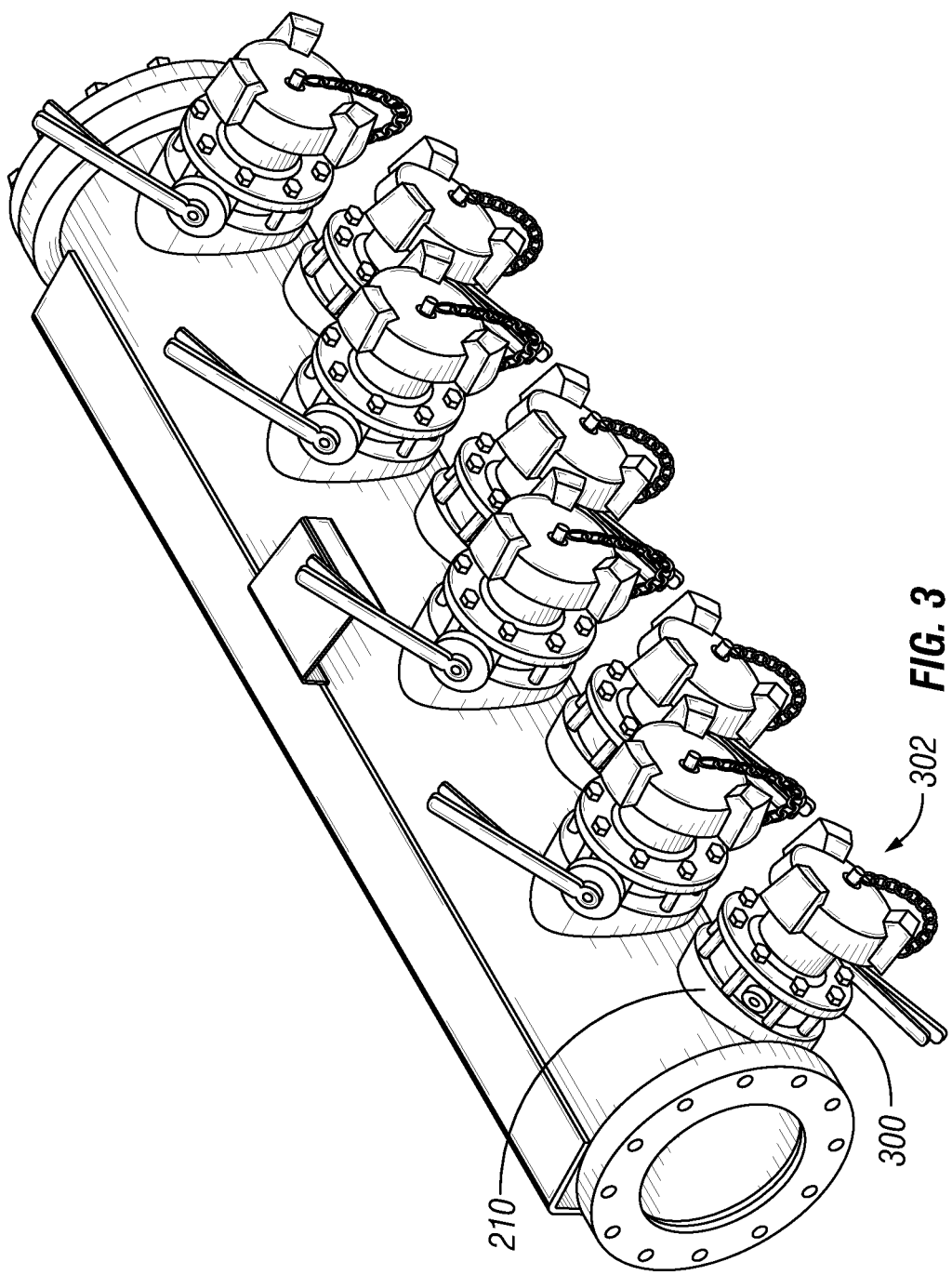
FIG. 3 is a manifold assembly that includes the manifold header of FIG. 2, according to one or more embodiments.

Each outlet includes a flange connection 212 on the exterior surface that can be bolted to a mating flange (one indicated, 300) that is coupled to a valve (one indicated, 302), as shown in FIG. 3. The valve 302, in turn, may be coupled to a pipe or hose (not shown) that transports the fluid from the distribution manifold header 218 to the piece of equipment, such as a pumping system 104 shown in FIG. 1, which utilizes the fluid. In other embodiments, the valve 302 may be omitted and the outlet 206 may be coupled to a flange (not shown) that is coupled to a pipe or hose. A blank flange or similar component (not shown) may also be bolted to an outlet 206 to seal an outlet 206 that is not in use.

In use, a fluid, e.g., fracturing fluid, may be received by the distribution manifold header 218 via a pumping system (not shown) in a blender, such as the blinder 114 shown in FIG. 1. The fracturing fluid is distributed via the outlets 206 of the distribution manifold header 218 to each of multiple pumping systems, such as pumping systems 104 shown in FIG. 1. The pumping systems then pressurize the fluid and pump the fluid into the wellbore via a wellhead, such as the wellhead 102 shown in FIG. 1.

Although the manifold header 218 is described above as a distribution manifold header, the manifold header 218 is not thereby limited. The manifold header may also be used as a suction manifold. In such instances, the outlets 206 are instead used to receive fluid from various sources and the combined fluid is discharged from the inlet 204.

Figure 4:
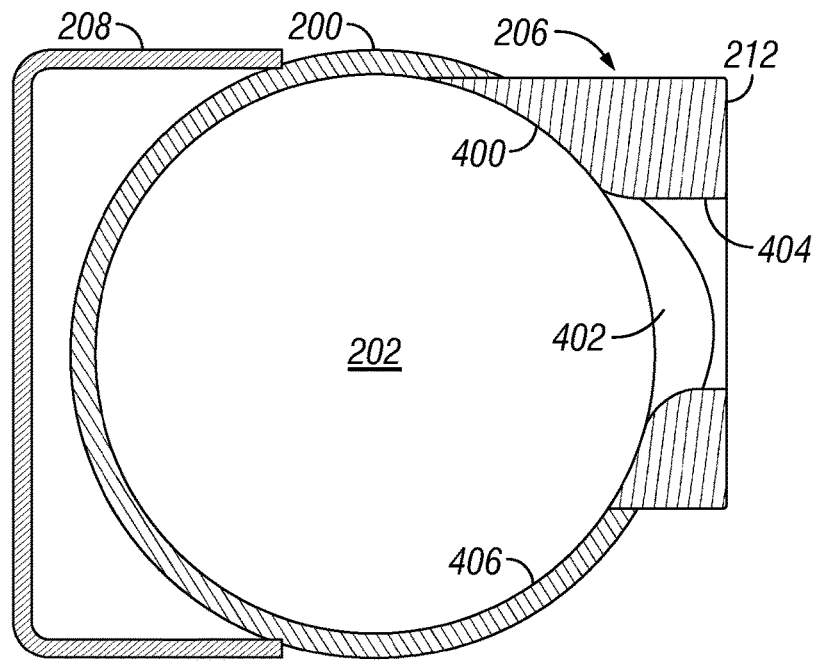
FIG. 4 is a cross-sectional view of the manifold header of FIG. 2 along line AA.
Figure 5A:
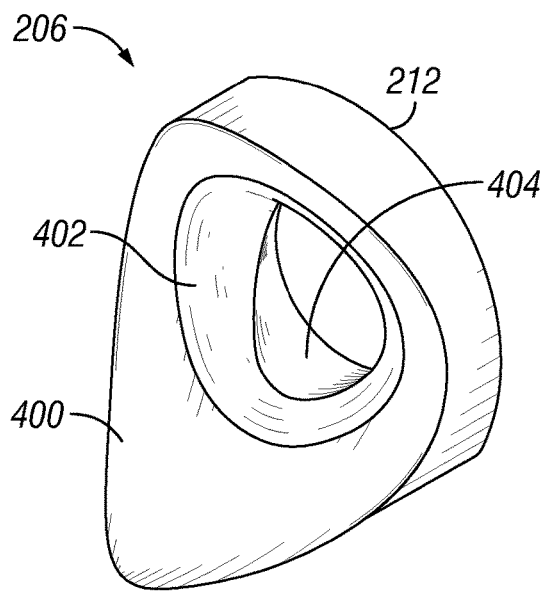
FIG. 5A is an isometric view of the outlet of FIG. 2.
Figure 5B:
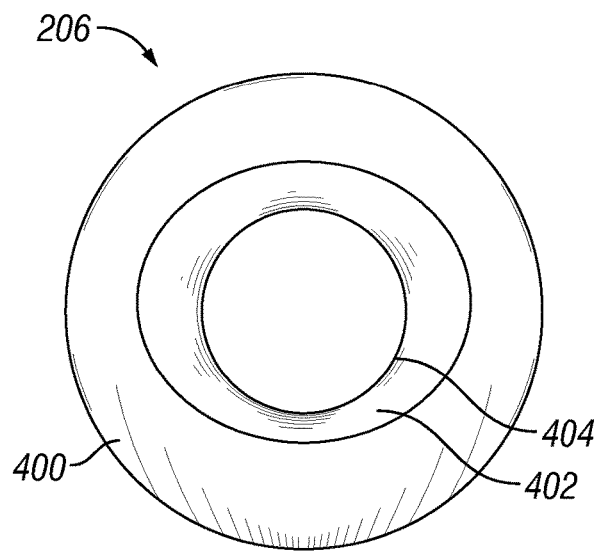
FIG. 5B is an internal view of the outlet of FIG. 2.

Turning now to FIGS. 4, 5A, and 5B, FIG. 4 is a cross-section of the distribution manifold header 218 of FIG. 2 along line AA and FIGS. 5A and 5B are isometric and internal views of an outlet 206, respectively. As shown in FIG. 4, portions of the manifold header body 200 are removed to create holes that receive outlets 206. The outlets 206 are then welded to the manifold header body 200 to form the distribution manifold header 218. In other embodiments, the outlets may be formed from the manifold header body 200 by machining, additive manufacturing, or other means known to those skilled in the art.

Each outlet includes an entrance section 400, a transition section 402, and an outlet port 404. As shown most clearly in FIG. 4, the entrance section 400 is shaped to have approximately the same profile as the inner surface 406 of the surrounding manifold header body 200. As shown most clearly in FIG. 5A, outlet, which is a cylinder having straight walls such that the fluid flow through the outlet port 404 is approximately perpendicular to a longitudinal axis of the manifold header body 200. the transition section 402 has a radius of curvature that transitions between the entrance section 400 and the outlet port 404 The surface area of the transition section 402 between the entrance section 400 and the outlet port 404 may not be uniform about the circumference of the outlet port 404 due to the position of the outlet port 404 relative to the manifold header body 200, as well as the size of the outlet port 404, as shown in FIGS. 4 and 5A. Additionally, although the transition section 402 is depicted in FIG. 5B is an oval, other embodiments may include a circular transition section 402.

By flowing fluid across the radius of curvature of the transitions section 402, instead of a sharp corner that would be created if the port was formed through the entrance section 400, less turbulence is introduced into the fluid flowing therethrough. This reduction in turbulence reduces the internal erosion of the outlet 206 as fluid is flowing from the internal bore 202 of the manifold header body 200 and through the outlet port 404, when compared to the previously described sharp corner.

Further examples include:

Example 1 is a pumping system for pumping a fluid for a wellsite. The pumping system includes a manifold assembly and a plurality of pumping systems, each pumping system in fluid communication with a respective outlet of the manifold header. The manifold assembly includes a manifold header. The manifold header includes a manifold header body and a plurality of outlets. The manifold header body includes an inlet to receive the fluid and an interior bore. Each outlet includes an entrance section shaped to have a profile that is approximately the same as a profile of an inner surface of the manifold header body, an outlet port shaped to flow the fluid approximately perpendicular to a longitudinal axis of the manifold header body, and a transition section shaped to have a radius of curvature that transitions from the profile of the entrance section to the outlet port and reduces internal erosion of the outlet due to the fluid flowing from the manifold header and through the outlet port.

In Example 2, the embodiments of any preceding paragraph or combination thereof further include wherein the manifold header body further comprises holes formed along a length of the manifold header body and each outlet is coupled to the manifold header body at a respective hole.

In Example 3, the embodiments of any preceding paragraph or combination thereof further include wherein the outlets are integrally formed with the manifold header body.

In Example 4, the embodiments of any preceding paragraph or combination thereof further include wherein a surface area of the transition section between the entrance section and the outlet port is not uniform about a circumference of the outlet port.

In Example 5, the embodiments of any preceding paragraph or combination thereof further include wherein a first outlet of the plurality of outlets is a different size than a second outlet of the plurality of outlets.

In Example 6, the embodiments of any preceding paragraph or combination thereof further include wherein the manifold assembly further comprises a plurality of valves, wherein each valve is connected to a respective outlet of the plurality of outlets.

In Example 7, the embodiments of any preceding paragraph or combination thereof further include wherein each outlet further comprises a flange connection on an exterior surface.

In Example 8, the embodiments of any preceding paragraph or combination thereof further include wherein the transition section is either an oval or a circle.

Example 9 is a method of pumping fluid into a wellbore. The method includes flowing the fluid from at least one of a blender or a storage tank to an inlet of a manifold header. The method also includes flowing the fluid into entrance sections of a plurality of outlets of the manifold header, each entrance section shaped to have a profile that is approximately the same as a profile of an inner surface of a manifold header body. The method further includes transitioning the fluid from the entrance sections to respective outlet ports of the plurality of outlets via transition sections of the plurality of outlets, each transition section having a radius of curvature that transitions from the profile of the entrance section to the outlet port to reduce internal erosion of the outlet due to the fluid flowing from the manifold header and through the outlet port, and each outlet port shaped to flow the fluid approximately perpendicular to a longitudinal axis of the manifold header body. The method also includes distributing the fluid to a plurality of pumping systems via the outlet ports. The method further includes pumping the fluid into the wellbore via the plurality of pumping systems.

In Example 10, the embodiments of any preceding paragraph or combination thereof further include wherein distributing the fluid to the pumping systems includes distributing the fluid to a first pumping system of the plurality of pumping systems via a first outlet port of a first outlet of the plurality of outlets. Distributing the fluid to the pumping systems also includes distributing the fluid to a second pumping system of the plurality of pumping systems via a second outlet port of a second outlet of the plurality of outlets. The first outlet is a different size than the second outlet.

In Example 11, the embodiments of any preceding paragraph or combination thereof further include wherein distributing the fluid to the plurality of pumping systems via the outlet ports further comprises opening a valve coupled to an outlet of the plurality of outlets.

In Example 12, the embodiments of any preceding paragraph or combination thereof further include wherein the fluid is fracturing fluid.

Example 13 is a manifold assembly that includes a manifold header. The manifold header includes a manifold header body and a plurality of outlets. The manifold header body includes an inlet to receive the fluid and an interior bore. Each outlet includes an entrance section shaped to have a profile that is approximately the same as a profile of an inner surface of the manifold header body, an outlet port shaped to flow the fluid approximately perpendicular to a longitudinal axis of the manifold header body, and a transition section shaped to have a radius of curvature that transitions from the profile of the entrance section to the outlet port and reduces internal erosion of the outlet due to the fluid flowing through the outlet port.

In Example 14, the embodiments of any preceding paragraph or combination thereof further include wherein the manifold header body further comprises holes formed along a length of the manifold header body and each outlet is coupled to the manifold header body at a respective hole.

In Example 15, the embodiments of any preceding paragraph or combination thereof further include wherein the outlets are integrally formed with the manifold header body.

In Example 16, the embodiments of any preceding paragraph or combination thereof further include wherein a surface area of the transition section between the entrance section and the outlet port is not uniform about a circumference of the outlet port.

In Example 17, the embodiments of any preceding paragraph or combination thereof further include wherein a first outlet of the plurality of outlets is a different size than a second outlet of the plurality of outlets.

In Example 18, the embodiments of any preceding paragraph or combination thereof further include a plurality of valves, wherein each valve is connected to a respective outlet of the plurality of outlets.

In Example 19, the embodiments of any preceding paragraph or combination thereof further include wherein each outlet further comprises a flange connection on an exterior surface.

In Example 20, the embodiments of any preceding paragraph or combination thereof further include wherein the transition section is either an oval or a circle.

As used herein, the term "approximately" includes all values within 10% of the target; e.g., approximately 11 inches includes all sizes from 9.9 inches to 12.1 inches, including 9.9 inches & 12.1 inches.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A pumping system for pumping a fluid for a wellsite, the system comprising:
    a manifold assembly comprising a manifold header comprising:
        a manifold header body comprising an inlet to receive the fluid and an interior bore; and
        at least one outlet from the interior bore, comprising:
            an entrance section shaped to have a profile that is approximately the same as a profile of an inner surface of the manifold header body interior bore;
            an outlet port shaped to flow the fluid approximately perpendicular to a longitudinal axis of the manifold header body; and
            a transition section comprising a shape that transitions from the profile of the entrance section to the outlet port and reduces internal erosion of the outlet due to the fluid flowing from the manifold header and through the outlet port; and
    a plurality of pumping systems, each pumping system in fluid communication with a respective outlet of the manifold header.

2. The pumping system of claim 1, wherein the manifold header body further comprises at least one hole formed along a length of the manifold header body and the at least one outlet is coupled to the manifold header body at a respective hole.

3. The pumping system of claim 1, wherein the at least one outlet is integrally formed with the manifold header body.

4. The pumping system of claim 1, wherein a surface area of the transition section between the entrance section and the outlet port is not uniform about a circumference of the outlet port.

5. The pumping system of claim 1, wherein the at least one outlet comprises a plurality of outlets and wherein a first outlet of the plurality of outlets is a different size than a second outlet of the plurality of outlets.

6. The pumping system of claim 1, wherein the manifold assembly further comprises at least one valve, wherein the at least one valve is connected to the at least one outlet.

7. The pumping system of claim 1, wherein the at least one outlet further comprises a flange connection on an exterior surface.

8. The pumping system of claim 1, wherein the shape comprises a radius of curvature.

9. A method of pumping fluid into a wellbore, the method comprising:
flowing the fluid from at least one of a blender or a storage tank to an inlet of a manifold header, the manifold header comprising a manifold header body with an interior bore;
flowing the fluid into entrance sections of a plurality of outlets from the interior bore of the manifold header;
transitioning the fluid from the entrance sections to respective outlet ports of the plurality of outlets via transition sections of the plurality of outlets, each transition section has a shape that transitions from the profile of the entrance section to the outlet port to reduce internal erosion of the outlet due to the fluid flowing from the manifold header and through the outlet port, and each outlet port shaped to flow the fluid approximately perpendicular to a longitudinal axis of the manifold header body;
distributing the fluid to a plurality of pumping systems via the outlet ports; and
pumping the fluid into the wellbore via the plurality of pumping systems.

10. The method of claim 9, wherein distributing the fluid to the plurality of pumping systems via the outlet ports comprises:
distributing the fluid to a first pumping system of the plurality of pumping systems via a first outlet port of a first outlet of the plurality of outlets;
distributing the fluid to a second pumping system of the plurality of pumping systems via a second outlet port of a second outlet of the plurality of outlets; and
wherein the first outlet is a different size than the second outlet.

11. The method of claim 9, wherein distributing the fluid to the plurality of pumping systems via the outlet ports further comprises opening a valve coupled to an outlet of the plurality of outlets.

12. The method of claim 9, wherein the fluid is fracturing fluid.

13. A manifold assembly comprising a manifold header comprising:
a manifold header body comprising an inlet to receive the fluid and an interior bore; and
an outlet from the interior bore, comprising:
an entrance section shaped to have a profile that is approximately the same as a profile of an inner surface of the manifold header body interior bore;
an outlet port shaped to flow the fluid approximately perpendicular to a longitudinal axis of the manifold header body; and
a transition section comprising a shape that transitions from the profile of the entrance section to the outlet port and reduces internal erosion of the outlet due to the fluid flowing through the outlet port.

14. The manifold assembly of claim 13, wherein the manifold header body further comprises a hole formed along a length of the manifold header body and the outlet is coupled to the manifold header body at the hole.

15. The manifold assembly of claim 13, wherein the outlet is integrally formed with the manifold header body.

16. The manifold assembly of claim 13, wherein a surface area of the transition section between the entrance section and the outlet port is not uniform about a circumference of the outlet port.

17. The manifold assembly of claim 13, further comprising the outlet.

18. The manifold assembly of claim 13, wherein the outlet further comprises a flange connection on an exterior surface.

19. The manifold assembly of claim 13, wherein the transition section is either an oval or a circle.

\* \* \* \* \*